Nov. 19, 1957 D. O. RUPE, JR 2,813,646
CART CONSTRUCTION
Filed June 2, 1955

Don O. Rupe, Jr.
INVENTOR.

BY Clarence A. O'Brien
and Harvey B. Jackson
Attorneys

United States Patent Office 2,813,646
Patented Nov. 19, 1957

2,813,646

CART CONSTRUCTION

Don O. Rupe, Jr., Boise, Idaho

Application June 2, 1955, Serial No. 512,792

1 Claim. (Cl. 214—373)

This invention generally relates to an improved and novel cart construction and more specifically provides a cart for use in connection with an improved type of basket wherein bulky material such as leaves, grass or the like, may be easily transported with a minimum of difficulty.

An object of the present invention is to provide a cart for transporting a material holding receptacle wherein the cart is so constructed that the receptacle may be easily lifted from a supporting surface and suspended from the cart for movement thereof.

Another object of the present invention is to provide an improved cart construction wherein forward wheels of the cart act as a fulcrum point for permitting tilting of the cart for engaging the central portion of a receptacle whereby the receptacle may be lifted to an elevated position by depressing the handle portion of the cart to a normal horizontal position.

Other important features of the present invention will reside in its simplicity of construction, ease of operation, ease of attachment to and removal from the receptacle employed in conjunction therewith, its adaptation for its particular purposes and its relatively inexpensive manufacturing cost.

Figure 1:
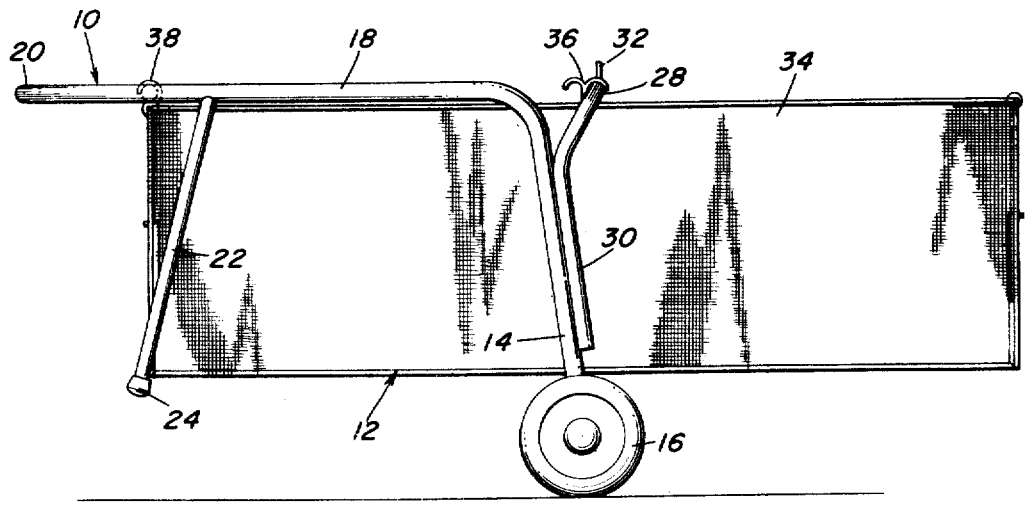
Figure 2:
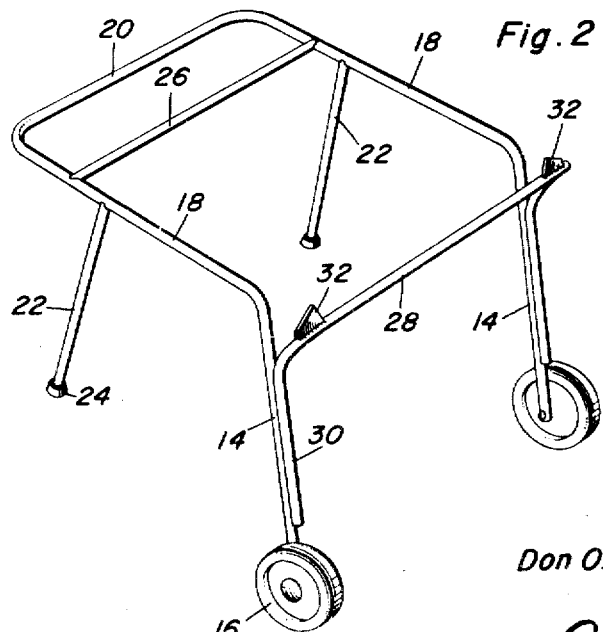

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the cart construction of the present invention employed in conjunction with a basket for which it was particularly constructed; and Figure 2 is a perspective view of the cart per se illustrating the details of construction thereof.

Referring now specifically to the drawings, it will be seen that the numeral 10 generally designates the cart construction of the present invention for employment in conjunction with a basket generally designated by the numeral 12.

The cart 10 generally includes a pair of depending and forwardly inclined supporting legs 14 having ground engaging wheels 16 at the bottom end thereof. Connected to the upper end of the legs 14 is a pair of rearwardly extending side rails 18 which are interconnected by a bight portion 20 which forms generally a horizontally disposed U-shaped frame. Depending downwardly from the side rails 18 is a pair of props 22 having ground engaging feet 24 at the lower end thereof. The props 22 are somewhat shorter than the legs 14 to permit tilting movement of the cart 10 about the wheels 16.

The bight portion 20 of the cart 10 forms a handle therefor and a transverse brace 26 is disposed in spaced parallel relation thereto.

An inverted U-shaped member having a bight portion 28 with depending legs 30 is provided with the depending legs 30 secured to the legs 14 supporting the wheels 16. The bight portion 28 forms a transverse brace which is in spaced parallel relation to the transverse brace 26. A pair of upstanding projections 32 is provided on the transverse brace 28 for the purpose described hereinafter.

The basket 12 generally includes side walls 34 having upstanding double hooks 36 at the center thereof and pivotal hooks 38 at each end thereof wherein the transverse brace 28 is adapted to engage one of the double hooks 36 and the hooks 38 at one end of the basket 12.

In operation, the basket 12 is normally positioned on the supporting surface and the cart 10 is positioned in straddling relation thereto with the brace 28 disposed past the double hook member 36. The handle 20 is then raised for tilting the cart 10 wherein the cart 10 may then be moved rearwardly for engaging the transverse brace 28 in the forwardly opening hook of the double hook 36, substantially as illustrated in Figure 1. The handle 20 may then be pushed downwardly wherein the cart 10 will fulcrum and move about the wheels 16 and the basket 12 will be raised at the center thereof. The handle 20 is continued downwardly until the feet 24 engage the supporting surface at which time the pivotal hooks 38 at the end of the basket 12 may be connected over the transverse brace 26 wherein the handle 20 may then be lifted and the entire cart and basket combination may be rolled upon the supporting wheels 16 to the desired destination at which time the above procedure may be reversed for detaching the basket 12 from the cart 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A transporting device for bulky material such as leaves or the like comprising an elongated parallelopiped receptacle having an open upper end for receiving the bulky material therein, said receptacle having supporting hooks at each end and a double hook in the center thereof, and means for raising and lowering said receptacle and transporting the receptacle, said means including a generally horizontal U-shaped frame having depending free ends, the lower free ends having wheels journaled thereon with the area between the depending free ends being free of obstructions, the combined vertical dimension of the wheels and depending free ends being greater than the vertical height of the receptacle, the bight portion of said U-shaped frame forming a handle for manipulation of the frame for assembly with the receptacle and for manipulating the device, each leg of said U-shaped frame having a depending prop thereon in the same vertical plane and in longitudinally spaced relation to the depending free ends and having a vertical dimension substantially equal to the height of the receptacle, a rear transverse support brace extending between the legs of the U-shaped frame rearwardly of the depending props for engagement with the supporting hooks on one end of said receptacle, a forward transverse support brace supported from the depending free ends of the frame in substantially the same horizontal plane as the rear transverse brace for engagement with the forwardly facing portions of the centrally disposed double hooks, a pair of upstanding lugs on said forward transverse brace for preventing lateral sliding movement of the receptacle in relation to the frame, the unobstructed area between props and free ends of the frame permitting the frame to be moved into straddling relation to the receptacle by longitudinal movement over either end thereof thereby permitting the handle to be swung upwardly for lowering the forward brace thereby permitting the forward brace to be engaged with the forwardly facing portions of the central double hooks, the central and forward portion of the receptacle being lifted by the forward brace when the handle is swung downwardly, the equal vertical dimension of the props and the receptacle permitting the rear brace to be swung downwardly for engagement with the hooks on the rear end of the receptacle whereby the rear end portion of the rear end portion of the receptacle is elevated when the handle and frame is swung upwardly to a normal horizontal position thereby suspending the receptacle from the frame, the longitudinal distance between the braces being slightly more than one-half of the length of the receptacle thereby supporting the majority of the weight of the material from the wheels with the overbalance of the weight toward the rear brace maintaining the receptacle in suspended relation to the braces.

References Cited in the file of this patent

UNITED STATES PATENTS

| | | |
|---|---|---|
| 908,472 | Lyons | Jan. 5, 1909 |
| 2,453,631 | Leser et al. | Nov. 9, 1948 |
| 2,463,164 | Exter | Mar. 1, 1949 |
| 2,598,136 | Schmitz | May 27, 1952 |
| 2,603,501 | Graves | July 15, 1952 |
| 2,714,461 | Walker | Aug. 2, 1955 |

FOREIGN PATENTS

| | | |
|---|---|---|
| 538,165 | Great Britain | July 23, 1941 |

U. S. DEPARTMENT OF COMMERCE
PATENT OFFICE

CERTIFICATE OF CORRECTION

Patent No. 2,813,646                                            November 19, 1957

Don O. Rupe, Jr.

It is hereby certified that error appears in the printed specification of the above numbered patent requiring correction and that the said Letters Patent should read as corrected below.

Column 3, line 10, strike out "the rear end portion of".

Signed and sealed this 25th day of March 1958.

(SEAL)
Attest:

KARL H. AXLINE                                         ROBERT C. WATSON
Attesting Officer                                    Commissioner of Patents